United States Patent
Ishizaki et al.

(10) Patent No.: US 12,296,411 B2
(45) Date of Patent: May 13, 2025

(54) FLUX-CORED WIRE AND WELDING METHOD

(71) Applicant: Kobe Steel, Ltd., Kobe (JP)

(72) Inventors: Keito Ishizaki, Fujisawa (JP); Takashi Yashima, Fujisawa (JP); Shun Izutani, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 817 days.

(21) Appl. No.: 17/620,211

(22) PCT Filed: Jun. 9, 2020

(86) PCT No.: PCT/JP2020/022756
§ 371 (c)(1),
(2) Date: Dec. 17, 2021

(87) PCT Pub. No.: WO2020/255808
PCT Pub. Date: Dec. 24, 2020

(65) Prior Publication Data
US 2022/0362892 A1    Nov. 17, 2022

(30) Foreign Application Priority Data

Jun. 20, 2019   (JP) .................................. 2019-114818

(51) Int. Cl.
| | | |
|---|---|---|
| *B23K 35/368* | (2006.01) | |
| *B23K 9/173* | (2006.01) | |
| *B23K 35/02* | (2006.01) | |
| *B23K 35/30* | (2006.01) | |
| *B23K 35/36* | (2006.01) | |
| *B23K 35/38* | (2006.01) | |
| *C22C 38/00* | (2006.01) | |
| *C22C 38/02* | (2006.01) | |
| *C22C 38/06* | (2006.01) | |
| *C22C 38/42* | (2006.01) | |
| *C22C 38/44* | (2006.01) | |
| *C22C 38/48* | (2006.01) | |
| *C22C 38/50* | (2006.01) | |
| *C22C 38/58* | (2006.01) | |

(52) U.S. Cl.
CPC ............ *B23K 35/368* (2013.01); *B23K 9/173* (2013.01); *B23K 35/0266* (2013.01); *B23K 35/3086* (2013.01); *B23K 35/3605* (2013.01); *B23K 35/383* (2013.01); *C22C 38/002* (2013.01); *C22C 38/005* (2013.01); *C22C 38/02* (2013.01); *C22C 38/06* (2013.01); *C22C 38/42* (2013.01); *C22C 38/44* (2013.01); *C22C 38/48* (2013.01); *C22C 38/50* (2013.01); *C22C 38/58* (2013.01)

(58) Field of Classification Search
CPC .. B23K 35/0266; B23K 35/368; B23K 9/173; B23K 35/3086; B23K 35/3605; B23K 35/383; B23K 35/3053; B23K 35/38; B23K 9/16; B23K 35/30; C22C 38/002; C22C 38/005; C22C 38/02; C22C 38/06; C22C 38/42; C22C 38/44; C22C 38/48; C22C 38/50; C22C 38/58
See application file for complete search history.

(56) References Cited

U.S. PATENT DOCUMENTS

| | | | | |
|---|---|---|---|---|
| 3,818,178 | A * | 6/1974 | Nakabayashi | B23K 35/368 |
| | | | | 219/137 WM |
| 4,571,480 | A * | 2/1986 | Sakai | B23K 35/368 |
| | | | | 219/146.52 |
| 6,441,334 | B1 * | 8/2002 | Aida | B23K 35/368 |
| | | | | 219/146.1 |
| 6,441,344 | B1 | 8/2002 | Aida et al. | |
| 2008/0093351 | A1 | 4/2008 | Matsushita et al. | |

FOREIGN PATENT DOCUMENTS

| | | |
|---|---|---|
| CN | 101164732 A | 4/2008 |
| CN | 109530960 A | 3/2019 |
| EP | 1 547 722 A1 | 6/2005 |
| JP | 63-57155 B2 | 11/1988 |
| JP | 9-277087 A | 10/1997 |
| JP | 11-58069 A | 3/1999 |
| JP | 2005-186138 A | 7/2005 |

OTHER PUBLICATIONS

International Search Report mailed on Sep. 8, 2020 in PCT/JP2020/022756 filed on Jun. 9, 2020 (3 pages).

* cited by examiner

*Primary Examiner* — John P. Dulka
(74) *Attorney, Agent, or Firm* — Oblon, McClelland, Maier & Neustadt, L.L.P.

(57) ABSTRACT

A flux-cored wire comprising a flux which is a core and a hoop which is an outer skin or sheath is described. The flux includes a strong deoxidizing metal element containing Mg and Al, and a fluoride powder. At least 60 mass % of a strong deoxidizing metal powder related to the strong deoxidizing metal element has a grain size of at most 150 μm. At least 60 mass % of the fluoride powder has a grain size of at most 75 μm. The flux is present at a concentration of 10-30 mass % relative to a total mass of the flux-cored wire. The flux-cored wire also requires a specific composition of elements.

12 Claims, No Drawings

FLUX-CORED WIRE AND WELDING METHOD

TECHNICAL FIELD

The present invention relates to a flux-cored wire and, in particular, to a flux-cored wire that is suitable even for welding in an overhead position or a vertical position. Furthermore, the present invention also relates to a gas shielded arc welding method that uses the flux-cored wire.

BACKGROUND ART

Existing flux-cored wires are versatile in that they can be used for all positions, that is, for flat welding, vertical welding, lateral welding, overhead welding, and the like. However, in vertical welding and overhead welding, as opposed to flat welding, deterioration in the bead appearance and a burn-through of molten metal tend to occur because of the influence of gravity, and, therefore, welding is particularly difficult. Accordingly, there has been a problem in that achieving good resistance to burn-through of molten metal and a good bead appearance for all positions is difficult.

To address this problem, PTL 1 discloses a flux-cored wire for gas shielded arc welding in which specific amounts of Al, Mg, and $BaF_2$ are included as essential flux components, and a flux filling ratio and Mn and Si contents relative to the total mass of the wire are optimized. In instances where arc welding is performed with this flux-cored wire with direct current and straight polarity in a low to medium welding current range, for example, a range of approximately 50 to 300 A, an amount of spatter that is generated in all-position welding is reduced. In addition, good weldability is achieved, and a weld metal having good toughness can be obtained.

Furthermore, PTL 2 discloses a metal-base flux-cored wire for gas-shielded arc welding and a gas-shielded arc welding method, with which an amount of spatter that is generated is reduced, and a sufficient throat thickness is ensured, even in cases in which vertical down welding is performed with direct current and straight polarity with an Ar—$CO_2$ mixture gas. In addition, good welding performance is achieved even in cases in which welding is performed with direct current and straight polarity in a welding position other than the vertical down position.

CITATION LIST

Patent Literature

PTL 1: Japanese Unexamined Patent Application Publication No. 11-58069
PTL 2: Japanese Unexamined Patent Application Publication No. 2005-186138

SUMMARY OF INVENTION

Technical Problem

However, in PTL 1, the welding current range to be used for the flux-cored wire is a low to medium current range. In particular, vertical welding, in which welding is difficult, was performed with a welding current of only 200 A, as shown in the Examples. In PTL 2, it is preferable that the welding current for performing all-position welding be 210 to 290 A in the cases of vertical down welding and horizontal flat fillet welding. However, PTL 2 states that in the cases of vertical up/overhead welding, it is preferable that the welding current be 110 to 140 A. PTL 2 also states that in the cases of vertical down welding and horizontal flat fillet welding, it is preferable that the arc voltage be 23 to 29 V, but, in the cases of vertical up/overhead welding, it is preferable that the arc voltage be 14 to 18 V.

For welding in a vertical position or an overhead position, as described above, when the welding current, is increased, welding defects, such as a burn-through of molten metal and deterioration in the bead appearance, noticeably occur. Accordingly, it was necessary to perform welding in a low current range, and, therefore, there was room for improvement in terms of high efficiency in welding operations.

Accordingly, an object of the present invention is to provide a flux-cored wire that, in overhead-position welding and vertical-position welding, inhibits welding defects, such as a burn-through of molten metal, among others, and realizes a good bead appearance, while ensuring high efficiency under the condition of a welding current range of relatively high currents, particularly welding currents of greater than 200 A. Another object is to provide a highly efficient welding method that uses the flux-cored wire.

Solution to Problem

The present inventors diligently performed studies and, consequently, discovered that the above-described problems can be solved by forming a flux-cored wire with a specific configuration. Accordingly, the present invention was completed.

Specifically, the present invention relates to the following [1] to [12].

[1] A flux-cored wire including flux and a hoop, the flux forming a core, the hoop forming a sheath, wherein the flux includes strong deoxidizing metal elements$_{(flux)}$ and at least one fluoride powder$_{(flux)}$, and the strong deoxidizing metal elements$_{(flux)}$ include Mg and Al; a total content of the strong deoxidizing metal elements$_{(flux)}$ is 15 to 35 mass % relative to a total mass of the flux; at least a portion of the Mg and the Al of the strong deoxidizing metal elements$_{(flux)}$ is present as a strong deoxidizing metal powder$_{(flux)}$, and the strong deoxidizing metal powder$_{(flux)}$ is at least one of a metal powder or an alloy powder; 60 mass % or more of the strong deoxidizing metal powder$_{(flux)}$ has a particle size of less than or equal to 150 µm; a total content of the at least one fluoride powder$_{(flux)}$ is 10 to 45 mass % relative to the total mass of the flux; 60 mass % or more of the at least one fluoride powder$_{(flux)}$ has a particle size of less than or equal to 75 µm; the flux is present in an amount of 10 to 30 mass %, relative to a total mass of the wire, in the flux-cored wire; and the flux-cored wire includes, relative to the total mass of the wire, $C_{(wire)}$: 0.5 mass % or less, $Si_{(wire)}$: 0.05 to 1.0 mass %, $Al_{(wire)}$: 1.0 to 3.5 mass %, $Mn_{(wire)}$: 1.0 to 3.0 mass %, $Mg_{(wire)}$: 0.3 to 0.9 mass %, a total of at least one fluoride$_{(wire)}$, in an amount F calculated in terms of fluorine: 0.30 to 1.20 mass %, and a total of strong deoxidizing metal elements$_{(wire)}$: 2.2 mass % or greater.

[2] The flux-cored wire according to [1], wherein the flux-cored wire further includes, relative to the total mass of the wire, $Ni_{(wire)}$: 15 mass % or less, $Mo_{(wire)}$: 5.0 mass % or less, $W_{(wire)}$: 3.0 mass % or less, $Nb_{(wire)}$: 5.0 mass % or less, $V_{(wire)}$: 5.0 mass % or less, $Cr_{(wire)}$: 30 mass % or less, $Ti_{(wire)}$: 3.0 mass % or less, $Zr_{(wire)}$: 2.0 mass % or less, $O_{(wire)}$: 0.05 mass % or less, $N_{(wire)}$: 0.05 mass % or less, $S_{(wire)}$: 0.05 mass % or less, $P_{(wire)}$: 0.05 mass % or less, $B_{(wire)}$: 0.05 mass % or less, $Cu_{(wire)}$: 5.0 mass % or less, $Ba_{(wire)}$: 5.0 mass % or less, a total of at least one alkali metal element$_{(wire)}$: 3.0 mass % or less, Ca$_{(wire)}$: 3.0 mass % or less, a total of at least one rare earth metal$_{(wire)}$: 0.5 mass % or less, and Fe$_{(wire)}$: 40 mass % or greater.

[3] The flux-cored wire according to [1], wherein the fluoride powder$_{(flux)}$ is at least one powder of a compound selected from the group consisting of $BaF_2$, $SrF_2$, $Na_3AlF_6$, $NaF$, $MgF_2$, and $CaF_2$.

[4] The flux-cored wire according to [2], wherein the fluoride powder$_{(flux)}$ is at least one powder of a compound selected from the group consisting of $BaF_2$, $SrF_2$, $Na_3AlF_6$, $NaF$, $MgF_2$, and $CaF_2$.

[5] The flux-cored wire according to any one of [1] to [4], wherein a water content (WC) is 0.010 to 0.100 mass % relative to the total mass of the wire, and the water content (WC) and the total content of the strong deoxidizing metal elements$_{(wire)}$ satisfy a relationship of 105≤ (the total content of the strong deoxidizing metal elements$_{(wire)}$/WC)≤ 170.

[6] The flux-cored wire according to any one of [1] to [4], wherein the content of Al$_{(wire)}$ and the content of Mg$_{(wire)}$, relative to the total mass of the wire, satisfy a relationship of $0.35 \leq (2 \times Mg_{(wire)}/0.6 \times Al_{(wire)}) \leq 1.50$.

[7] The flux-cored wire according to any one of [1] to [4], wherein the strong deoxidizing metal elements$_{(flux)}$ further includes at least one element selected from the group consisting of Zr, Ti, and Ca, and contents of the elements, relative to the total mass of the wire, satisfy a relationship of $5 \leq \{(Mg_{(wire)} + Al_{(wire)})/(Zr_{(wire)} + Ti_{(wire)} + Ca_{(wire)})\} \leq 70$.

[8] The flux-cored wire according to any one of [1] to [4], wherein the flux contains Ni, and the Ni is at least one selected from the group consisting of elemental Ni, Cu—Ni, Fe—Ni, and Ni—Mg.

[9] A gas shielded arc welding method, which uses the flux-cored wire according to any one of [1] to [4], the gas shielded arc welding method including performing welding at a welding current of greater than 200 A in a shielding gas atmosphere.

[10] The gas shielded arc welding method according to [9], wherein the welding is performed in a welding position, and the welding position is at least one of an overhead position or a vertical position.

[11] The gas shielded arc welding method according to [9], wherein the shielding gas contains 70 vol % or more Ar.

[12] The gas shielded arc welding method according to [9], wherein the shielding gas contains 70 vol % or more $CO_2$.

Advantageous Effects of Invention

With the present invention, welding can be performed in all positions even in a relatively high welding current range. In particular, even in instances where a welding current greater than 200 A is used, highly efficient welding can be performed in an overhead position or a vertical position while welding defects, such as a burn-through of molten metal, among others, are inhibited, and a good bead appearance is maintained.

DESCRIPTION OF EMBODIMENTS

Embodiments of the present invention will now be described in detail. Note that the present invention is not limited to the embodiments described below.

In this specification, when "to" is used in a numerical range, the number preceding "to" is included as the lower limit, and the number following "to" is included as the upper limit. Furthermore, the symbol "$_{(flux)}$" inserted directly after the name of a substance or an element indicates that the substance or element is one included in flux. Likewise, the symbol "$_{(wire)}$" indicates that the substance or element is one included in a flux-cored wire, and the symbol "$_{(hoop)}$" indicates that the substance or element is one included in a hoop.

A flux-cored wire (hereinafter sometimes referred to simply as a "wire") of the present embodiment includes flux and a hoop. The flux forms a core, and the hoop forms a sheath.

The flux includes strong deoxidizing metal elements$_{(flux)}$ and at least one fluoride powder$_{(flux)}$, and the strong deoxidizing metal elements$_{(flux)}$ include Mg and Al. A total content of the strong deoxidizing metal elements$_{(flux)}$ is 15 to 35 mass % relative to a total mass of the flux. At least one of one or more metal powders and one or more alloy powders involving the strong deoxidizing metal elements$_{(flux)}$ is included as a strong deoxidizing metal powder$_{(flux)}$, and 60 mass % or more of the strong deoxidizing metal powder$_{(flux)}$ has a particle size of less than or equal to 150 μm.

Furthermore, a total content of the at least one fluoride powder$_{(flux)}$ is 10 to 45 mass % relative to the total mass of the flux, and 60 mass % or more of the at least one fluoride powder$_{(flux)}$ has a particle size of less than or equal to 75 μm.

The flux is present in an amount of 10 to 30 mass %, relative to a total mass of the wire, in the flux-cored wire. That is, a flux ratio is 10 to 30 mass %.

Furthermore, the flux-cored wire includes, relative to the total mass of the wire, C$_{(wire)}$: 0.5 mass % or less, Si$_{(wire)}$: 0.05 to 1.0 mass %, Al$_{(wire)}$: 1.0 to 3.5 mass %, Mn$_{(wire)}$: 1.0 to 3.0 mass %, Mg$_{(wire)}$: 0.3 to 0.9 mass %, a total of at least one fluoride$_{(wire)}$, in an amount F calculated in terms of fluorine: 0.30 to 1.20 mass %, and a total of strong deoxidizing metal elements$_{(wire)}$: 2.2 mass % or greater.

<Flux>

The flux, which forms the core of the flux-cored wire of the present embodiment, includes strong deoxidizing metal elements$_{(flux)}$ and at least one fluoride powder$_{(flux)}$. The strong deoxidizing metal elements include two or more elements, with Mg and Al being essential elements. One or more additional strong deoxidizing metal elements, such as Ti, Zr, Ca, and rare earth metals (hereinafter sometimes referred to as "REMs") may be optionally included. It is preferable that at least one element selected from the group consisting of Ti, Zr, and Ca be included as an optional strong deoxidizing metal element. Note that the flux may include, as necessary, one or more additives, in addition to the strong deoxidizing metal elements and the fluoride powder. Examples of the additives include Ni; deoxidizing elements, such as Si and Mn; oxides, such as $SiO_2$, $TiO_2$, and FeO; and nitrides. The balance of the flux is iron powder and impurities.

Mg, which is a strong deoxidizing metal element, can produce a sufficient deoxidizing effect and is, therefore, an element that realizes good toughness. Furthermore, the high melting point of oxides of Mg improves a formation speed at which the slag forms on a surface of the molten pool. As the current with which welding is performed increases, a temperature of the molten pool increases, which reduces a viscosity and a surface tension of the molten pool. Accordingly, in overhead welding and vertical welding, a burn-through of molten metal and deterioration in the bead appearance are more likely to occur as the current with which welding is performed increases. However, an addition of an appropriate amount of Mg enables, even when the welding current is greater than 200 A, slag to be formed on the surface of the molten pool at an early time, before a shape of the molten pool is changed by gravity. As a result, burn-throughs of molten metal and deterioration in the bead appearance are prevented. In addition, since Mg has a high vapor pressure, Mg stabilizes the arc with the metal vapor and, therefore, contributes to welding performance. In particular, a high stabilizing effect is produced in explosive transfer, which is a form of droplet transfer. Note that the "explosive transfer" is a form of transfer in which a gas component in the droplet formed at an end of the wire explodes, and, accordingly, transfer to the base metal takes place.

Mg is included in the flux, and some Mg may be included in the sheath (hereinafter sometimes referred to simply as a "hoop"). Note that the Mg included in the flux may be in the form of, for example, a metal powder of Mg, an alloy powder of an alloy, such as Mg—Al or Fe—Mg, or a fluoride, such as $MgF_2$. Note that regarding metal powders and alloy powders, a metal powder of Mg may be hereinafter sometimes referred to as a Mg powder, and an alloy powder of Mg—Al as a Mg—Al powder or the like, for example.

The content of $Mg_{(wire)}$ is to be greater than or equal to 0.3 mass % relative to the total mass of the wire, and as a result, the above-described effect of the strong deoxidizing metal element can be produced. In addition, the upper limit of the content is to be less than or equal to 0.9 mass %, and as a result, a failure to achieve sufficient mechanical properties, which may otherwise be caused by the formation of inclusions in the weld, is prevented.

Accordingly, the content of $Mg_{(wire)}$ is to be 0.3 to 0.9 mass % relative to the total mass of the wire. The content is preferably greater than or equal to 0.55 mass % and less than or equal to 0.85 mass %. Furthermore, a content of the $Mg_{(flux)}$, which is included in the flux, is preferably greater than or equal to 1.5 mass % and less than or equal to 8.0 mass % relative to the total mass of the flux.

Similar to Mg, Al is an element that is essentially included in the flux as a strong deoxidizing metal element, and some Al may be included in the sheath (hoop). Note that the Al included in the flux may be in the form of, for example, a metal powder of Al, an alloy powder of an alloy, such as Mg—Al or Fe—Al, or a fluoride, such as $AlF_3$.

The content of $Al_{(wire)}$ is to be greater than or equal to 1.0 mass % relative to the total mass of the wire; as a result, resistance to burn-through of molten metal is achieved, and the arc is stabilized by the effect of early formation of slag. Consequently, the effect of promoting the explosive transfer is produced. In addition, the upper limit of the content is to be less than or equal to 3.5 mass %, and as a result, an excessive degree of explosive transfer is prevented, which stabilizes the arc.

Accordingly, the content of $Al_{(wire)}$ is to be 1.0 to 3.5 mass % relative to the total mass of the wire. The content is preferably greater than or equal to 1.8 mass % and less than or equal to 3.1 mass %. Furthermore, a content of the Al (flux), which is included in the flux, is preferably greater than or equal to 10.0 mass % and less than or equal to 25.0 mass % relative to the total mass of the flux.

As described above, Mg and Al are strong deoxidizing metal elements that are essential for the flux in the present invention from the standpoint of a slag formation speed and arc stability. In addition, it is necessary that at least, one of the elements be in the form of a metal powder or an alloy powder that serves as a strong deoxidizing metal $powder_{(flux)}$, and, accordingly, the elements be included together in the flux. That is, the strong deoxidizing metal $powder_{(flux)}$ combines with oxygen in the process of welding and, accordingly, produces a toughness improving effect attributable to deoxidation and a droplet transfer stabilizing effect attributable to metal vapor. However, if the elements are included in the state of oxides, these effects are not produced. Furthermore, if the elements are in the state of oxides, the flux does not sufficiently dissolve during welding, therefore, undissolved oxides are moved toward a periphery by the convection of the molten pool, and as a result, formation of uniform slag over the entire area of the surface of the molten pool cannot be expected. Note that the expression "state of oxides" encompasses, for example, $Al_2O_3$, MgO, and the like.

The strong deoxidizing metal $powder_{(flux)}$ includes Mg and Al that are in the form of a single metal powder or a metal powder of composite metals, that is, an alloy powder. Specifically, an Al powder or a Mg powder, which is a single metal powder of Al or Mg, and/or a metal powder of composite metals including at least one of Al or Mg, that is, an alloy powder, is included. Examples of the metal powder of composite metals include Fe—Al powders, Ni—Al—Si powders, Fe—Mg powders, and Mg—Al powders. The strong deoxidizing metal $powder_{(flux)}$ may include one metal powder or two or more metal powders.

Furthermore, the $Mg_{(flux)}$ and the $Al_{(flux)}$, which are added to the flux, have a property of combining with oxygen present in the weld metal and slagging out. Since Mg is a very strong deoxidizing metal element, most of the Mg does not remain in the weld metal, and substantially all of the Mg slags out. On the other hand, Al does not have a deoxidizing ability comparable to that of Mg. Thus, approximately 60% of the Al slags out, and approximately 40% of the Al remains in the weld metal.

Slag that is an oxide containing Al and/or Mg has a spinel structure that contains $MgAl_2O_4$, $FeAl_2O_4$, or the like and is, therefore, a very stable oxide with a high melting point. Since the slag has a solidification rate greater than a solidification rate of, for example, a typical titanium slag system, excellent resistance to burn-through of molten metal is exhibited, in particular, during overhead welding or vertical welding.

It is preferable that amounts of metallic addition of $Mg_{(wire)}$ and $Al_{(wire)}$, that is, contents of Mg and Al relative to the total mass of the wire, satisfy a relationship of $0.35 \le (2 \times Mg_{(wire)}/0.6 \times Al_{(wire)}) \le 1.50$. When the ratio between the amounts of metallic addition is greater than or equal to 0.35, an increase in the amount of Al remaining in the weld metal is prevented. Furthermore, excessive formation of slag is prevented, and deterioration in penetration, bead wettability, slag covering, and the like are also prevented. Accordingly, a good bead appearance is realized. In addition, when the ratio between the amounts of metallic addition is less than or equal to 1.50, a sufficient amount of slag is formed, therefore, the molten pool can be suitably suppressed by the slag even in all-position welding, such as overhead welding or vertical welding, and as a result, excellent resistance to burn-through of molten metal is achieved. Note that, in terms of producing the above-described effects to a greater degree, it is more preferable that the value of the ratio represented by $(2 \times Mg_{(wire)}/0.6 \times Al_{(wire)})$ be greater than or equal to 0.80; even more preferably, the value is greater than or equal to 0.85, and furthermore, the value is more preferably less than or equal to 1.30, even more preferably less than or equal to 1.20, and still more preferably less than or equal to 1.15.

In addition, regarding the strong deoxidizing metal $powder_{(flux)}$, it is to be ensured that 60 mass % or more of the strong deoxidizing metal $powder_{(flux)}$ has a particle size of less than or equal to 150 µm. If the amount of particles of the strong deoxidizing metal $powder_{(flux)}$ having a particle size of less than or equal to 150 μm is less than 60 mass %, the flux does not sufficiently dissolve during welding, therefore, the slag formation speed decreases, and, consequently, good resistance to burn-through of molten metal and a good bead appearance may not be achieved. Furthermore, undissolved metal powder is moved toward a periphery by the convection of the molten pool, and as a result, formation of uniform slag over the entire area of the surface of the molten pool cannot be expected. It is preferable that the proportion of particles of the strong deoxidizing metal powder$_{(flux)}$ having a particle size of less than or equal to 150 μm be 70 mass % or more so that good resistance to burn-through of molten metal and a good bead appearance and shape can be achieved. More preferably, the proportion is 80 mass % or more. Furthermore, it is also more preferable that 60 mass % or more of the strong deoxidizing metal powder$_{(flux)}$ have a particle size of less than or equal to 100 μm.

Note that the particle sizes of the strong deoxidizing metal powder and the fluoride powder in this specification can be measured by using a sieve having an appropriate mesh size, in accordance with JIS Z 8801-1:2006.

The total content of the strong deoxidizing metal elements$_{(flux)}$, which are included in the flux, is to be 15 to 35 mass % relative to the total mass of the flux. When the total content of the strong deoxidizing metal elements$_{(flux)}$ is greater than or equal to 15 mass %, slag is sufficiently formed, which results in good resistance to burn-through of molten metal. Furthermore, when the total content is less than or equal to 35 mass %, a good bead appearance is achieved. The total content of the strong deoxidizing metal elements$_{(flux)}$ is preferably greater than or equal to 18 mass % and less than or equal to 32 mass % relative to the total mass of the flux.

The total content of the strong deoxidizing metal elements$_{(wire)}$, which are included in the wire, is to be greater than or equal to 2.2 mass % and is preferably greater than or equal to 2.5 mass %, relative to the total mass of the wire. When the content of the strong deoxidizing metal elements$_{(wire)}$ is greater than or equal to 2.2 mass %, the molten pool is suitably suppressed by the slag, and as a result, burn-throughs of molten metal are inhibited from occurring in overhead welding or vertical welding performed with a welding current of greater than or equal to 200 A. Furthermore, the content of the strong deoxidizing metal elements$_{(wire)}$ may be less than or equal to 4.0 mass %. This is preferable because, in such a case, excessive formation of slag is inhibited, and, therefore, a better bead appearance can be realized.

Note that in instances where, in addition to Al and Mg, one or more different strong deoxidizing metal elements, such as Zr, Ti, Ca, and REMs, which will be described later, are included, the total content of the strong deoxidizing metal elements$_{(wire)}$ and the total content of the strong deoxidizing metal elements$_{(flux)}$ are total contents including the contents of the different elements.

The fluoride powder$_{(flux)}$ of the present embodiment is to be added to the flux and, consequently, enables a size reduction of the separated droplets in explosive transfer. The total content of at least one fluoride powder$_{(flux)}$ is to be 10 to 45 mass % relative to the total mass of the flux. When the total content is greater than or equal to 10 mass %, a size reduction of the separated droplets is achieved. Furthermore, when the total content is less than or equal to 45 mass %, droplets can be favorably formed. The total content of at least one fluoride powder$_{(flux)}$ is preferably greater than or equal to 10.5 mass % and less than or equal to 41 mass %.

The total content of at least one fluoride powder$_{(wire)}$, which is included in the flux-cored wire, in an amount F calculated in terms of fluorine is to be 0.30 to 1.20 mass % relative to the total mass of the wire. When the total content of at least one fluoride powder$_{(wire)}$ is greater than or equal to 0.30 mass %, a size reduction of the separated droplets is achieved in droplet transfer. Furthermore, when the total content is less than or equal to 1.20 mass %, droplets can be favorably formed without the occurrence of excessive volatilization in the wire. The total content of at least one fluoride powder$_{(wire)}$ in an amount F calculated in terms of fluorine is preferably greater than or equal to 0.40 mass % and less than or equal to 0.90 mass %.

Regarding the fluoride powder$_{(flux)}$, it is to be ensured that, 60 mass % or more of the fluoride powder$_{(flux)}$ has a particle size of less than or equal to 75 μm. By ensuring that the amount of particles of the fluoride powder having a particle size of less than or equal to 75 μm is 60 mass % or more, insufficient dissolution of the flux is to be prevented. As a result, it is likely that the fluorine is sufficiently vaporized so that the stability of the arc can be maintained, and, therefore, good performance is achieved. Tt is preferable that the proportion of particles of the fluoride powder$_{(flux)}$ having a particle size of less than or equal to 75 μm be 70 mass % or more so that good performance can be achieved. More preferably, the proportion is 75 mass % or more.

Examples of the fluoride powder$_{(flux)}$ include powders of a fluoride, and examples of the fluoride include $BaF_2$, $SrF_2$, $Na_3AlF_6$, NaF, $CaF_2$, $AlF_3$, and $MgF_2$; one or more of these may be included. In particular, it is preferable, in terms of welding performance, that the fluoride powder$_{(flux)}$ be at least one powder of a compound selected from the group consisting of $BaF_2$, $SrF_2$, $Na_3AlF_6$, $AlF_3$, $MgF_2$, NaF, and $CaF_2$. More preferably, the fluoride powder$_{(flux)}$ is at least one powder of a compound selected from the group consisting of $BaF_2$, $SrF_2$, $Na_3AlF_6$, NaF, $MgF_2$, and $CaF_2$. Furthermore, since Ba, which has a low work function, has an effect of further stabilizing the cathode spot and, therefore, contributes to improving welding performance, it is more preferable that $BaF_2$, which is a fluoride involving Ba, be included.

In instances where $BaF_2$ is included in the fluoride powder, it is preferable, in terms of welding performance, that a content of $BaF_{2(wire)}$ be greater than or equal to 1.0 mass % relative to the total mass of the wire. More preferably, the content is greater than or equal to 1.2 mass %. Furthermore, it is preferable, in terms of reducing spatter, that the content of $BaF_{2(wire)}$ be less than or equal to 6 mass %. More preferably, the content is less than or equal to 5.5 mass %.

It is preferable that water be present in the flux-cored wire of the present embodiment. This is because, in such a case, when extreme heat is applied near the arc, volume expansion due to the vaporization of the water produces an explosion effect. As a result, the formed droplets are finely divided, and, therefore, coarsening of the droplets is inhibited, which reduces spatter. Furthermore, the oxygen present in water ($H_2O$) causes an oxidation reaction with metals, such as Mn, Al, and Mg, which results in the formation, on the molten pool, of slag that is an oxide. This enables improved resistance to burn-through of molten metal to be exhibited in all-position welding, such as overhead welding or vertical welding.

It is preferable that a water content (WC) be greater than or equal to 0.010 mass % and less than or equal to 0.100 mass %, relative to the total mass of the wire. When the water content (WC) is greater than or equal to 0.010 mass % (100 mass-ppm), a sufficient amount of oxygen necessary for the formation of slag can be supplied from the wire side, which inhibits burn-throughs of molten metal to a greater degree, so that welding can be accomplished. Furthermore, when the water content (WC) is less than or equal to 0.100 mass % (1000 mass-ppm), destabilization of the arc due to excessive vapor pressure is prevented, which in turn inhibits the generation of spatter. WC is more preferably greater than or equal to 0.015 mass % (150 mass-ppm) and less than or equal to 0.050 mass % (500 mass-ppm). Note that the water content of the wire can be determined by using a Karl Fischer method that uses dry air as a carrier gas.

In addition to the above, it is preferable, from the standpoint of resistance to burn-through of molten metal, that a relationship between the water content (WC, mass %) and the total content (mass %) of the strong deoxidizing metal elements$_{(wire)}$ relative to the total mass of the wire satisfies 105≤ (the total content of the strong deoxidizing metal elements$_{(wire)}$/WC)≤170.

While the above-described effects are produced, an amount of diffusible hydrogen in the weld metal increases as an amount of hydrogen in the wire increases because of the hydrogen separated from the water in the arc. As a result, a risk of the occurrence of low-temperature cracking, which is a welding defect, increases. An effective way to reduce the amount of diffusible hydrogen is to add fluorine. Accordingly, it is preferable that a ratio (WC/F) between WC (mass %) and the total (mass %) of at least one fluoride$_{(wire)}$ in an amount F calculated in terms of fluorine be greater than or equal to 0.025; more preferably, the ratio is greater than or equal to 0.030. Furthermore, in consideration of welding performance, it is preferable that the ratio be less than or equal to 0.100; more preferably, the ratio is less than or equal to 0.090.

In the present embodiment, the flux is present in an amount of 10 to 30 mass % relative to the total mass of the wire, that is, the flux ratio is 10 to 30 mass %. When the flux ratio is greater than or equal to 10 mass %, the effects of the components that form the flux and the effects of any combination of the components can be sufficiently produced. Furthermore, when the flux ratio is less than or equal to 30 mass %, the need to reduce a thickness of the hoop, which forms the sheath, can be eliminated, and, consequently, the arc is stabilized, which in turn inhibits the generation of spatter. The flux ratio is more preferably greater than or equal to 11 mass % and less than or equal to 20 mass %.

In the configuration of the flux-cored wire, $C_{(wire)}$: 0.5 mass % or less, $Mn_{(wire)}$: 1.0 to 3.0 mass %, and $Si_{(wire)}$: 0.05 to 1.0 mass %, relative to the total mass of the wire, are included, in addition to the elements and compounds described above.

<$C_{(wire)}$: 0.5 mass % or less (inclusive of 0 mass %)>

C is optionally added to adjust a strength of the weld metal, and, therefore, no lower limit is specified. On the other hand, when $C_{(wire)}$ is present in an amount less than or equal to 0.5 mass % relative to the total mass of the wire, a decrease in toughness due to an excessive increase in the strength of the weld metal is prevented. Preferably, a content of $C_{(wire)}$ is less than or equal to 0.2 mass %.

<$Mn_{(wire)}$: 1.0 to 3.0 mass %>

Mn is an element effective for producing a deoxidizing effect and achieving solid solution strengthening, and, therefore, Mn improves mechanical properties, such as tensile strength and toughness. A content of $Mn_{(wire)}$ is 1.0 to 3.0 mass % relative to the total mass of the wire. When Mn is present in an amount greater than or equal to 1.0 mass %, the effect of solid solution strengthening can be sufficiently produced, and, consequently, good mechanical properties are achieved. Furthermore, when the content is less than or equal to 0.3 mass %, an excessive improvement in the strength is inhibited, and, consequently, appropriate toughness is ensured. The content of Mn is preferably greater than or equal to 1.5 mass % and less than or equal to 2.5 mass %, relative to the total mass of the wire. More preferably, the content is less than or equal to 2.0 mass %.

<$Si_{(wire)}$: 0.05 to 1.0 mass %>

Si is an element that improves the affinity between the base metal and the weld metal, and, therefore, S is included in the flux, in an amount greater than or equal to 0.05 mass % relative to the total mass of the wire. Furthermore, the upper limit is specified to be 1.0 mass % so that a decrease in toughness can be prevented. In terms of producing the above-described effect to a greater degree, it is preferable that a content of Si be greater than or equal to 0.1 mass % and less than or equal to 0.80 mass %.

Elements that can be optionally added as necessary, in addition to the above-described elements and compounds, will be described below in detail. Note that the contents of the elements described below are all in mass % relative to the total mass of the wire.

<$Ni_{(wire)}$: 15 mass % or less>

Ni is an element that can improve toughness and tensile strength for instances in which a high heat input and/or a high interpass temperature are used, and, therefore, Ni may be optionally added if necessary. If an excessive amount of Ni is added, viscosity of the molten pool decreases. If the viscosity of the molten pool is decreased in instances of overhead welding or vertical welding, there is a danger that welding defects, such as a burn-through of molten metal and deterioration in the bead appearance, may occur due to the influence of gravity. Accordingly, in instances where $Ni_{(wire)}$ is to be optionally added, $Ni_{(wire)}$ is to be present in an amount preferably less than or equal to 15 mass % and more preferably less than or equal to 5 mass % relative to the total mass of the wire. In terms of producing the above-described effect, it is preferable that a content of Ni be greater than or equal to 0.01 mass %; more preferably, the content is greater than or equal to 0.05 mass %.

In instances where Ni is added, it is preferable that the Ni be in the form of at least one of elemental metal or compounds selected from the group consisting of elemental Ni, Cu—Ni, Fe—Ni, and Ni—Mg, to be included in the flux. In cases where Ni is included in any of the above-mentioned forms, the formation of slag preferentially occurs, and, consequently, burn-throughs of molten metal can be more favorably inhibited from occurring during overhead welding or vertical welding.

<$Mo_{(wire)}$: 5.0 mass % or less>
<$Nb_{(wire)}$: 5.0 mass % or less>
<$V_{(wire)}$: 5.0 mass % or less>
<$Cr_{(wire)}$: 30 mass % or less>

Mo, Nb, V, and Cr are all elements that can improve toughness or tensile strength, and, therefore, any of these elements may be optionally added if necessary to adjust toughness or tensile strength. Furthermore, these elements are elements that form carbides having a high melting point. Note that examples of carbides having a high melting point include $Mo_2C$, $NbC$, $VC$, and $Cr_3C_2$. Because of their high melting point, slag of these carbides forms at an early time on the surface of the molten pool. This property enables the inhibition of burn-throughs of molten metal and achievement of a good bead appearance in instances in which overhead welding is performed.

Mo, Nb, V, and Cr may be included in a manner such that, preferably, one of the following is satisfied: $Mo_{(wire)}$: 5.0 mass % or less, $Nb_{(wire)}$: 5.0 mass % or less, $V_{(wire)}$: 5.0 mass % or less, and $Cr_{(wire)}$: 30 mass % or less, so that a good bead appearance can be maintained. More preferably, the elements may be included in a manner such that all of the above are satisfied. Furthermore, a total content of Mo, Nb, and V is preferably less than or equal to 5.0 mass % and more preferably less than or equal to 3.0 mass %, relative to the total mass of the wire.

The form of addition of Mo, Nb, V, and Cr is not particularly limited. The elements may be added to the hoop and/or may be included in the flux. Furthermore, it, is preferable that the total content of Mo, Nb, and V be greater than or equal to 0.005 mass % relative to the total mass of the wire.

<$W_{(wire)}$: 3.0 mass % or less>

W is an element effective for improving strength, and, therefore, W may be optionally added if necessary to adjust tensile strength. If an excessive amount of W is added, degradation in toughness due to excessive strength occurs. Accordingly, it is preferable that a content of W be less than or equal to 3.0 mass % relative to the total mass of the wire.

<$Ti_{(wire)}$: 3.0 mass % or less>

Ti is a strong deoxidizing metal element and is, therefore, an element effective for improving toughness through a deoxidizing effect. An appropriate amount of Ti may be added to adjust toughness. However, if an excessive amount of Ti is added, inclusions become coarse, and inclusions excessively increase, which reduce toughness. Accordingly, it is preferable that a content of Ti be limited to less than or equal to 3.0 mass % relative to the total mass of the wire.

<$Zr_{(wire)}$: 2.0 mass % or less>

Similar to Ti, Zr is a strong deoxidizing metal element and is, therefore, an element effective for improving toughness through a deoxidizing effect. An appropriate amount of Zr may be added to adjust toughness. However, if an excessive amount of Zr is added, inclusions become coarse, and inclusions excessively increase, which reduce toughness. Accordingly, it is preferable that a content of Zr be less than or equal to 2.0 mass % relative to the total mass of the wire.

<$Ca_{(wire)}$: 3.0 mass % or less>

Ca can be added from $CaF_2$, $CaCO_3$, and/or the like. Similar to Ti and Zr, Ca is a strong deoxidizing metal element and is, therefore, an element effective for improving toughness through a deoxidizing effect. An appropriate amount of Ca may be added to adjust toughness. However, if an excessive amount of Ca is added, inclusions become coarse, and inclusions excessively increase, which reduce toughness. Accordingly, it is preferable that a content of Ca be less than or equal to 3.0 mass % relative to the total mass of the wire.

<REMs (rare earth metals)$_{(wire)}$: 0.5 mass % or less>

REMs (rare earth metals) are elements effective for stabilizing the arc, thereby reducing spatter. Furthermore, REMs have deoxidizing and desulfurizing effects and, therefore, contribute to improving toughness. If an excessive amount of a REM is added, arc deflection tends to occur, which degrades welding performance. Accordingly, a total content of at least one REM is preferably less than or equal to 0.5 mass % and more preferably less than or equal to 0.2 mass %, relative to the total mass of the wire. Among REMs, La, Ce, and Y are more preferably used.

$Ti_{(wire)}$, $Zr_{(wire)}$, $Ca_{(wire)}$, and REMs, described above, can serve as strong deoxidizing metal elements, together with Al and Mg. Al and Mg may be included in the sheath. Tt is preferable that Al and Mg be included in the flux. It is preferable that the contents (in mass % relative to the total mass of the wire) of $Mg_{(wire)}$, $Al_{(wire)}$, $Zr_{(wire)}$, $Ti_{(wire)}$, and $Ca_{(wire)}$, which are among the strong deoxidizing metal elements, satisfy a relationship of $5 \leq \{(Mg_{(wire)}+Al_{(wire)})/(Zr_{(wire)}+Ti_{(wire)}+Ca_{(wire)})\} \leq 70$. As referred to herein, "$Mg_{(wire)}$" and "$Al_{(wire)}$" respectively refer to the total amount of Mg and the total amount of Al, included in the flux and the sheath, that is, Mg and Al included in the entire wire. Since oxides of these elements have a high melting point, the oxides form slag at an early time on the surface of the molten pool and, consequently, inhibit burn-throughs of molten metal and deterioration in the bead appearance. In particular, slag containing Mg or Al tends to aggregate, and, therefore, such slag has a tendency to form over the entire area of the surface of the molten pool. In contrast, slag containing Zr, Ti, or Ca tends to be dispersed, and, therefore, formation of such slag has a tendency to be concentrated at or near the periphery because of the flow of the molten pool. Consequently, no significant effect is produced in terms of ensuring resistance to burn-through of molten metal and a good bead appearance.

However, these elements are elements that tend to contribute to providing ferrite nucleation sites and, therefore, can improve toughness. Accordingly, in instances where Zr, Ti, and Ca are to be added, the value of $\{(Mg_{(wire)}+Al_{(wire)})/(Zr_{(wire)}+Ti_{(wire)}+Ca_{(wire)})\}$, which is the ratio between the total content of $Mg_{(wire)}$ and $Al_{(wire)}$ and the total content of $Zr_{(wire)}$, $Ti_{(wire)}$, and $Ca_{(wire)}$, may be greater than or equal to 5, which is a preferred range in which a sufficient amount of $Mg_{(wire)}$ and $Al_{(wire)}$ are provided; therefore, in such a case, resistance to burn-through of molten metal and a good bead appearance can be achieved. On the other hand, the value of the ratio may be less than or equal to 70, which is preferable from the standpoint of toughness; therefore, in such a case, sufficient toughness can be ensured.

The ratio is more preferably greater than or equal to 25 and even more preferably greater than or equal to 27. Furthermore, the ratio is more preferably less than or equal to 60 and even more preferably less than or equal to 55.

<O (oxygen)$_{(wire)}$: 0.05 mass % or less>

O comes from oxides, water, and the like present in the shielding gas or the flux. If an excessive amount of O is added during welding, the surface tension of the molten pool decreases, and, consequently, in overhead welding or vertical welding, a burn-through of molten metal and/or deterioration in the bead appearance occur. Accordingly, a content of $O_{(wire)}$ is preferably less than or equal to 0.05 mass % and more preferably less than or equal to 0.04 mass %, relative to the total mass of the wire. In addition, oxygen present in the wire causes an oxidation reaction with metals, such as Al and Mg, in the weld metal, and, consequently, oxides (slag) are formed on the molten pool. As a result, improved resistance to burn-through of molten metal can be exhibited in all-position welding, such as overhead welding and vertical welding.

<$N_{(wire)}$; 0.05 mass % or less>

N is effective for improving strength and contributes to toughness by combining with Ti, Zr, Nb, Cr, or Mn to form a nitride. It is desirable that a content of $N_{(wire)}$ be less than or equal to 0.05 mass % so that degradation in toughness due to excessive strength can be inhibited, and the occurrence of welding defects, such as porosity defects and cracking, can be inhibited.

<$S_{(wire)}$; 0.05 mass % or less>

Similar to 0, S is an element that reduces the surface tension of the molten pool. Furthermore, if a large amount of S is added, a probability of the occurrence of cracking increases. Accordingly, it is preferable that a content of $S_{(wire)}$ be less than or equal to 0.05 mass %, from the standpoint of resistance to burn-through of molten metal, a bead appearance and shape, and crack resistance.

<$P_{(wire)}$: 0.05 mass % or less>

P is an impurity element. From the standpoint of crack resistance, it is preferable that a content of $P_{(wire)}$ be limited to less than or equal to 0.05 mass %.

<$B_{(wire)}$: 0.05 mass % or less>

Addition of a small amount of B produces an effect of refining a microstructure of the weld metal, thereby improving the low-temperature toughness of the weld metal. It is preferable that a content of $B_{(wire)}$ be less than or equal to 0.05 mass % relative to the total mass of the wire so that the occurrence of high-temperature cracking in the weld metal can be inhibited. Note that B can be added from a component included in the steel sheath and/or can be added from elemental B and/or a powder of an alloy in the flux. Examples of the alloy include Fe—B, Fe—Mn—B, and Mn—B.

<$Cu_{(wire)}$: 5.0 mass % or less>

Cu is an element that contributes to improving the strength of the weld metal. It is desirable that a content of $Cu_{(wire)}$ be less than or equal to 5.0 mass % relative to the total mass of the wire so that a decrease in the toughness of the weld metal due to excessive strength thereof can be inhibited. Note that Cu can be added from the component in a hoop Cu plating applied to a surface of the steel sheath and/or can be added from elemental Cu and/or a powder of an alloy in the flux. Examples of the alloy include Cu—Zr and Fe—Si—Cu.

<$Ba_{(wire)}$: 5.0 mass % or less>

Ba can be added from $BaF_2$, $BaCO_3$, and/or the like. Ba has an effect of stabilizing the arc, thereby reducing the amount of spatter that is generated. However, if an excessive amount of Ba is added, arc deflection occurs, which degrades welding performance. Accordingly, it is preferable that a content of $Ba_{(wire)}$ be less than or equal to 5.0 mass % relative to the total mass of the wire. More preferably, the content is less than or equal to 3.0 mass %.

<Total of at least one alkali metal element$_{(wire)}$: 3.0 mass % or less>

Alkali metal elements improve arc stability, thereby contributing to improving welding performance by, for example, reducing spatter. If an excessive amount of a compound involving an alkali metal element is added, moisture absorption resistance of the wire is degraded, which may result in the occurrence of welding defects, such as cracking and porosity defects. Accordingly, it is preferable that a total content of at least one alkali metal element be less than or equal to 3.0 mass % relative to the total mass of the wire. Note that examples of the alkali metal element include Na, K, and Li; the alkali metal is to be in the form of an oxide, a fluoride, and/or the like and is to be added to the flux or deposited on a surface of the hoop.

<$Fe_{(wire)}$: 40 mass % or greater>

A content of $Fe_{(wire)}$ is preferably greater than or equal to 40 mass %, more preferably greater than or equal to 60 mass %, and even more preferably greater than or equal to 80 mass %. Furthermore, the content of $Fe_{(wire)}$ is preferably less than or equal to 95 mass % and more preferably less than or equal to 94 mass %. Fe is included as $Fe_{(hoop)}$, which forms the sheath, and as $Fe_{(flux)}$, which is in the form of an iron powder or an alloy powder added to the flux.

The balance of the wire is impurities, examples of which include Ta and Be.

<Hoop>

The hoop, which forms the sheath of the flux-cored wire of the present embodiment, has a thickness and a width, which are not particularly limited. For example, the thickness is preferably greater than or equal to 0.5 mm and less than or equal to 1.5 mm. The width is preferably less than or equal to 30 mm.

When the thickness of the hoop is greater than or equal to 0.5 mm, the flux is unlikely to leak from the seam portion during heating in welding, and, consequently, the generation of spatter is inhibited. Furthermore, when the thickness is less than or equal to 1.5 mm, coarsening of the droplets is inhibited, and, in explosive transfer, a size reduction of the separated droplets can be achieved; consequently, the generation of spatter is inhibited.

When the width of the hoop is less than or equal to 30 mm, coarsening of the droplets is inhibited, and, in explosive transfer, a size reduction of the separated droplets can be achieved. As a result, the generation of spatter is inhibited, which is preferable. Furthermore, the lower limit of the width of the hoop is not particularly limited, and, from the standpoint of preventing the leakage of the flux and vaporized fluorine from the seam, it is preferable that the width be greater than or equal to 10 mm.

A metal foil of the hoop may be a mild steel-based metal foil or a stainless steel-based metal foil. Either of these may be selected in accordance with the purpose of welding. For example, in instances where a property for achieving sufficient penetration to produce a welded joint of a structure is required, it is preferable to use a mild steel-based metal foil. In instances where a welding operation is performed in which dilution by the base metal is to be inhibited by achieving shallow penetration, and the amount of weld deposition is to be increased, as in build-up welding, for example, it is preferable to use a SUS (stainless steel)-based metal foil.

An example of the mild steel-based metal foil is a metal foil containing $C_{(hoop)}$: 0.005 to 0.040 mass % or less, $Si_{(hoop)}$: 0.005 to 0.050 mass % or less, $Mn_{(hoop)}$: 0.01 to 0.30 mass % or less, $P_{(hoop)}$: 0.01 mass % or less, and $S_{(hoop)}$: 0.01 mass % or less, relative to a total mass of the hoop. In addition, a preferred metal foil is one such that, regarding Si and Mn, contents of $Si_{(hoop)}$ and $Mn_{(hoop)}$, relative to the total mass of the hoop, and contents of $Si_{(wire)}$ and $Mn_{(wire)}$, relative to the total mass of the wire, satisfy the following relationship: $0.01 \leq \{(Si_{(hoop)}+Mn_{(hoop)}) \times (HR/100)\}/(Si_{(wire)}+Mn_{(wire)})\} \leq 0.25$. Here, "HR" refers to a hoop ratio. It is preferable that the hoop ratio be 70 to 90 mass %.

In the mild steel-based metal foil, $C_{(hoop)}$ contributes to improving strength. While no particular lower limit is specified, it is preferable, from the standpoint of mechanical properties of the weld metal, that C be present in an amount greater than or equal to 0.005 mass % so that tensile strength can be adjusted. In addition, when $C_{(hoop)}$ is present in an amount less than or equal to 0.040 mass %, processing of the hoop is facilitated, so that the wire can be readily produced. In addition, from the standpoint of ease of production, it is more preferable that, a content of $C_{(hoop)}$ be less than or equal to 0.030 mass % relative to the total mass of the hoop.

In the mild steel-based metal foil, $Si_{(hoop)}$ contributes to electrical resistance of the metal foil. As an amount of addition of Si increases, the electrical resistance of the metal foil increases, which increases the Joule heat input to the wire during welding. That is, the wire becomes more fusible, which increases the amount of weld deposition and, therefore, provides an effect of increasing efficiency. In terms of producing the effect, it is more preferable that a content of Si be greater than or equal to 0.005 mass % relative to the total mass of the hoop. On the other hand, if the Joule heat is excessively increased, viscosity and surface tension of the droplets decrease, and, consequently, the action of the arc pressure may increase spatter. Accordingly, from the standpoint of welding performance, it is preferable that the content of Si be less than or equal to 0.050 mass %.

In the mild steel-based metal foil, a content of $Mn_{(hoop)}$ is to be greater than or equal to 0.01 mass %, and as a result, the amount of weld deposition can be increased as with the $Si_{(hoop)}$. Furthermore, the upper limit of the content of $Mn_{(hoop)}$ is to be less than or equal to 0.40 mass %, and as a result, the welding performance is improved as with the $Si_{(hoop)}$.

It is preferable that a content of $P_{(hoop)}$ and a content of $S_{(hoop)}$ be each less than or equal to 0.01 mass %.

P is an element that is present as an impurity. Since P tends to segregate and, therefore, degrades toughness and weldability, it is preferable that a content of P be as low as possible.

S has a property of reducing surface tension. If welding is performed with a wire having a large amount of S relative to the total mass of the wire, the surface tension of the surface of the molten pool decreases, and, consequently, burn-throughs of molten metal and deterioration of the bead appearance noticeably occur. On the other hand, regarding the droplet transfer, low surface tension promotes the separation of the droplets, so that good welding performance is achieved.

In addition, regarding Si and Mn, it is preferable that the contents of $Si_{(hoop)}$ and $Mn_{(hoop)}$, relative to the total mass of the hoop, and the contents of $Si_{(wire)}$ and $Mn_{(wire)}$, relative to the total mass of the wire, satisfy the following relationship (ratio): $0.01 \leq \{(Si_{(hoop)}+Mn_{(hoop)}) \times (HR/100)/(Si_{(wire)}+Mn_{(wire)})\} \leq 0.25$.

When the parameter $\{(Si_{(hoop)}+Mn_{(hoop)}) \times (HR/100)/(Si_{(wire)}+Mn_{(wire)})\}$ is less than or equal to 0.25, an excessive increase in electrical resistance is prevented, which prevents an increase in the Joule heat input into the wired during welding. As a result, a viscosity and a surface tension of the droplets are maintained, without decreasing, and, therefore, there is a tendency for deterioration in the performance due to the action of the arc pressure to be inhibited. Accordingly, it is preferable, from the standpoint of welding performance, that the parameter be less than or equal to 0.25.

When $\{(Si_{(hoop)}+Mn_{(hoop)}) \times (HR/100)/(Si_{(wire)}+Mn_{(wire)})\}$ is greater than or equal to 0.01, there is a tendency for deterioration in efficiency associated with a decrease in the amount of weld deposition to be inhibited. Accordingly, it is preferable that the parameter be greater than or equal to 0.01

An example of the SUS-based metal foil is a metal foil containing $C_{(hoop)}$: 0.0001 to 0.06 mass %, $Si_{(hoop)}$: 0.1 to 0.8 mass %, $Mn_{(hoop)}$: 0.05 to 3.00 mass %, $P_{(hoop)}$: 0.05 mass % or less, $S_{(hoop)}$: 0.05 mass % or less, $Cr_{(hoop)}$: 10.5 to 30.0 mass %, and $Ni_{(hoop)}$: 3.0 to 14.0 mass %, relative to a total mass of the hoop. In addition, a preferred metal foil is one such that, regarding Cr and Ni, contents of $Cr_{(hoop)}$ and $Ni_{(hoop)}$, relative to the total mass of the hoop, and contents of $Cr_{(wire)}$ and $Ni_{(wire)}$, relative to the total mass of the wire, satisfy the following relationship: $0.80 \leq \{(Cr_{(hoop)}+Ni_{(hoop)}) \times (HR/100)/(Cr_{(wire)}+Ni_{(wire)})\} \leq 1.20$. Here, "HR" refers to a hoop ratio. It is preferable that the hoop ratio be 70 to 90 mass %.

In the SUS-based metal foil, C contributes to improving strength. While no particular lower limit is specified, it is preferable, from the standpoint of mechanical properties of the weld metal, that a content of C be greater than or equal to 0.0001 mass % so that tensile strength can be adjusted. In addition, when the content of C is less than or equal to 0.06 mass %, processing of the hoop is facilitated, so that the wire can be readily produced. Accordingly, such a content of C is preferable.

In the SUS-based metal foil, Si contributes to electrical resistance of the metal foil. As an amount of addition of Si increases, the electrical resistance of the metal foil increases, which increases the Joule heat input to the wire during welding. That is, the wire becomes more fusible, which increases the amount of weld deposition and, therefore, provides an effect of increasing efficiency. In terms of producing the effect, it is more preferable that a content of Si be greater than or equal to 0.1 mass % relative to the total mass of the hoop. On the other hand, if the Joule heat is excessively increased, viscosity and surface tension of the droplets decrease, and, consequently, the action of the arc pressure may increase spatter. Accordingly, from the standpoint of welding performance, it is preferable that the content of Si be less than or equal to 0.8 mass %.

In the SUS-based metal foil, Mn, as well as Si, contributes to electrical resistance. It is preferable, from the standpoint of the amount of weld deposition, that a content of Mn be greater than or equal to 0.05 mass %. More preferably, the content is greater than or equal to 0.1 mass %. Furthermore, it is preferable, from the standpoint of welding performance, that the content of Mn be less than or equal to 3.00 mass %. More preferably, the content is less than or equal to 2.50 mass %.

In the SUS-based metal foil, it is preferable that P and S be each present in an amount less than or equal to 0.05 mass %.

P is an element that is present as an impurity. Since P tends to segregate and, therefore, degrades toughness and weldability, it is preferable that a content of P be as low as possible.

S has a property of reducing surface tension. If welding is performed with a wire having a large amount of S relative to the total mass of the wire, the surface tension of the surface of the molten pool decreases, and, consequently, burn-throughs of molten metal and deterioration of the bead appearance noticeably occur. On the other hand, regarding the droplet transfer, low surface tension promotes the separation of the droplets, so that good welding performance is achieved. In the flux-cored wire of the present embodiment, the hoop portion constitutes most of the droplets formed at an end of the wire during welding. Accordingly, a configuration in which an appropriate amount of S is added to the hoop is preferable in terms of welding performance. A content of $S_{(hoop)}$ in the hoop may be greater than or equal to 0.0005 mass % relative to the total mass of the hoop. This is preferable because, with such a content, the effect described above can be expected. On the other hand, if an excessive amount of $S_{(hoop)}$ is added to the hoop, the surface tension excessively decreases, and as a result, the action of the arc pressure may cause droplets to be blown off, which may form spatter. Accordingly, it is preferable that the content of $S_{(hoop)}$ be less than or equal to 0.05 mass %.

In the SUS-based metal foil, Cr is an essential element and contributes to the electrical resistance of the metal foil. Because of the amount of addition of Cr, the degree of contribution is high compared with Si and Mn. As the amount of addition of Cr increases, the electrical resistance of the metal foil increases, which increases the Joule heat input to the wire during welding. That is, the wire becomes more fusible, which increases the amount of weld deposition and, therefore, provides an effect of increasing efficiency. In terms of sufficiently producing the effect, it is more preferable that a content of $Cr_{(hoop)}$ be greater than or equal to 10.5 mass % relative to the total mass of the hoop. On the other hand, if the Joule heat is excessively increased, viscosity and surface tension of the droplets decrease, and, consequently, the action of the arc pressure may increase spatter. Accordingly, from the standpoint of welding performance, it is preferable that the content of $Cr_{(hoop)}$ be less than or equal to 30.0 mass %.

In the SUS-based metal foil, Ni, as well as Cr, is an essential element and contributes to the electrical resistance of the metal foil. Because of the amount of addition of Ni, the degree of contribution is high compared with Si and Mn. As the amount of addition of Ni increases, the electrical resistance of the metal foil increases, which increases the Joule heat input to the wire during welding. That is, the wire becomes more fusible, which increases the amount of weld deposition and, therefore, provides an effect of increasing efficiency. In terms of producing the effect, it is more preferable that a content of $Ni_{(hoop)}$ be greater than or equal to 3.0 mass % relative to the total mass of the hoop. On the other hand, if the Joule heat is excessively increased, viscosity and surface tension of the droplets decrease, and, consequently, the action of the arc pressure may increase spatter. Accordingly, from the standpoint of welding performance, it is preferable that the content of $Ni_{(hoop)}$ be less than or equal to 14.0 mass %.

In the SUS-based metal foil, Cr and Ni greatly contribute to the electrical resistance of the metal foil as described above. Regarding Cr and Ni, it is preferable that the contents of $Cr_{(hoop)}$ and $Ni_{(hoop)}$, relative to the total mass of the hoop, and the contents of $Cr_{(wire)}$ and $Ni_{(wire)}$, relative to the total mass of the wire, satisfy the following relationship (ratio): $0.80 \leq \{(Cr_{(hoop)}+Ni_{(hoop)}) \times (HR/100)/(Cr_{(wire)}+Ni_{(wire)})\} \leq 1.20$.

When the parameter $\{(Cr_{(hoop)}+Ni_{(hoop)}) \times (HR/100)/(Cr_{(wire)}+Ni_{(wire)})\}$ is greater than or equal to 0.80, the amount of weld deposition increases, and, therefore, improvement in efficiency is achieved. Accordingly, such a value of the parameter is preferable. Furthermore, in terms of producing the effect of reducing spatter, it is preferable that the parameter be less than or equal to 1.20.

<Welding Method and Welding Conditions>

With the flux-cored wire of the present embodiment, burn-throughs of molten metal are prevented, and an excellent bead appearance is achieved, even under the condition of a welding current of greater than 200 A; therefore, welding can be performed with high efficiency.

Any welding position may be used. Because of its excellent resistance to burn-through of molten metal, the flux-cored wire is suitable for use in all-position welding and, in particular, is more suitable for use for welding in a welding position that is at least one of a vertical position or an overhead position. Furthermore, the flux-cored wire is also suitable for use in welding performed in a manner such that the position continuously changes from an overhead position to a vertical position.

Among different types of gas shielded arc welding, gas shielded arc welding that uses straight polarity, with the electrode side serving as the − (minus) side and the base metal side serving as the +(plus) side, is preferable.

The type of gas used in the welding is not particularly limited. Examples of the gas include single gases, such as Ar gas, $CO_2$ gas, and $O_2$ gas, and gas mixtures containing two or more of these. In instances where Ar gas is used, it is preferable to use a shielding gas containing 70 vol % or more Ar. In instances where $CO_2$ gas is used, it is preferable to use a shielding gas containing 70 vol % or more $CO_2$.

A flow rate of the gas is also not particularly limited. For example, the flow rate is approximately 15 to 30 L/min.

A shape of a welding current waveform to be specified may be a linear or pulse shape. Note that as referred to herein, the "linear" means that the waveform does not have a special shape.

In instances where direct current is used, any of welding current ranges, including any of low to high currents, may be suitably used. Even in the instance of overhead welding or vertical welding, a welding current range greater than 200 A can be used. A welding voltage is also not particularly limited and is, for example, 15 to 35 V. A welding speed is also not particularly limited and is, for example, 10 to 50 cm/minute. In addition, a wire extension is also not particularly limited and may be, for example, specified to be 10 to 30 mm. The conditions mentioned above are non-limiting examples, and welding conditions may be determined in accordance with the intended use.

EXAMPLES

The present invention will now be described in more detail with reference to examples. The present invention is not limited to the examples and may be practiced by making changes within a range that is in accordance with a purpose of the present invention. All of such changes are encompassed within the technical scope of the present invention. Furthermore, the welding conditions described herein are merely examples, and embodiments disclosed herein are not limited to the following welding conditions.

<Evaluation Methods>

(Particle Sizes of Strong Deoxidizing Metal Powder$_{(flux)}$ and Fluoride Powder$_{(flux)}$)

The particle size and a proportion thereof of strong deoxidizing metal powders$_{(flux)}$ (Al powder, Mg powder, and Al—Mg powder) included in the flux were measured in accordance with JIS Z 8801-1:2006, by using a 150-μm mesh sieve. The results are shown in Table 3, in the column "Strong deoxidizing metal elements in flux, Proportion of particles having particle size of 150 μm or less".

The particle size and a proportion thereof of a fluoride powder$_{(flux)}$ included in the flux were measured in accordance with JIS Z 8801-1:2006, by using a 75-μm mesh sieve. The results are shown in Table 3, in the column "Fluoride powder in flux, Proportion of particles having particle size of 75 μm or less".

(Composition of Flux-Cored Wire)

Contents relative to the total mass of the wire are shown in Table 1 and Table 2, and contents relative to the total mass of the flux are shown in Table 3.

(Water Content)

The water content (WC) relative to the total mass of the wire was measured by using a Karl Fischer moisture analyzer (coulometric moisture meter) that used a CA-200, manufactured by Mitsubishi Chemical Analytech Co., Ltd. The measurement conditions were as follows.

Three samples, each of which was a piece of the flux-cored wire cut to a length of 3 cm, were prepared, and the water content thereof was measured by using a Karl Fischer method for evaluation. In the measurement, heating was performed at 750° C. to vaporize water in the flux of the flux-cored wire, and dried air, which was used as a carrier gas, was directed into the analyzer. The results are shown in Table 2, in the column "Wire water content (WC)", in which the values are expressed on a mass % basis.

(Welding Conditions)

Bead-on-plate welding was performed on a flat plate by using obtained flux-cored wires under the following conditions. The flat plate was made of a rolled steel product SS400 (JIS G 3106:2017) and had a plate thickness of 12 mm. Note that the welding voltage (arc voltage), welding speed, and feed rate were as shown in Table 4.

Wire diameter: φ1.4 mm
Shielding gas: $CO_2$, a flow rate of 25 L/min
Welding position: overhead position
Welding current: direct current and straight polarity
Wire extension: 15 mm The welding was started at a welding current of 90 A, and the welding current was gradually increased. The maximum current value at which no burn-through of molten metal occurred was designated as a "threshold current".

The threshold current, at and below which no burn-through of molten metal occurred, and other conditions are shown in Table 4.

(Resistance to Burn-Through of Molten Metal)

Overhead welding was performed while the welding current value was increased, and a visual examination was made as to whether a burn-through of molten metal had occurred. In this manner, resistance to burn-through of molten metal was evaluated. The threshold current, which is the maximum current value at which no burn-through of molten metal occurs, was determined. A rating of "A" was given to samples that had a threshold current value of 230 A or greater, a rating of "B" was given to samples that had a threshold current value of 200 A or greater and less than 230 A, and a rating of "C" was given to samples that had a threshold current value of less than 200 A. "A" and "B" were regarded as a "pass", and "C" was regarded as a "fail". The results are shown in Table 4.

(Bead Appearance)

Welding was performed in an overhead position to provide a weld length of 30 cm, and then, a bead shape of the weld was visually observed. In this manner, bead appearance was evaluated. A rating of "A" was given in instances in which a good bead shape was achieved, a rating of "B" was given in instances in which a bead width varied at two or fewer regions, and a rating of "C" was given in instances in which the bead width varied at three or more regions. "A" and "B" were regarded as a "pass", and "C" was regarded as a "fail". The results are shown in Table 4.

<Preparation of Flux-Cored Wire>

A mild steel was used to form the sheath. While the sheath was formed into a cylindrical shape, flux was loaded into the sheath. In this manner, flux-cored wires of Examples (W1 to W14) and Comparative Examples (W15 to W20), which had the composition shown in Table 1 or Table 2, were prepared. Note that the flux ratios of W1 to W20, shown in Table 1 and Table 2, were all 13 mass %, and the balance of the composition of W1 to W20, shown in Table 1 and Table 2, was Fe and impurities.

In Table 1, the numerical value in each of the fields represents a content (mass %) of the component relative to the total mass of the wire, and the numerical values in the "REM" column each represent a total content (mass %) of one or more rare earth metals. Furthermore, the symbol "–" in the table means being less than or equal to a detection limit.

Referring to Table 2, the amount of addition of a fluoride powder in the flux, the amount of addition of strong deoxidizing metal elements in the flux, the content of $Mg_{(flux)}$, and the content of $Al_{(flux)}$ are all contents (mass %) relative to the total mass of the flux.

TABLE 1

Chemical composition of flux-cored wire mass % ("—" indicates being less than or equal to detection limit)

| Wire Nos. | C | Si | Mn | P | S | Cu | Ni | Cr | Mo | Nb | Ba | F | Al | Mg | Ti | Zr | REM | Ca |
|---|---|---|---|---|---|---|---|---|---|---|---|---|---|---|---|---|---|---|
| W1 | 0.020 | 0.15 | 1.73 | 0.007 | 0.005 | — | 0.10 | — | — | — | 2.00 | 0.55 | 2.14 | 0.66 | — | 0.094 | — | — |
| W2 | 0.020 | 0.15 | 2.52 | 0.007 | 0.005 | — | 0.10 | — | — | — | 2.10 | 0.58 | 3.02 | 0.81 | — | 0.094 | — | — |
| W3 | 0.099 | 0.15 | 2.47 | 0.008 | 0.005 | — | 0.10 | — | — | — | 2.10 | 0.58 | 2.92 | 0.78 | — | 0.094 | — | — |
| W4 | 0.047 | 0.15 | 1.89 | 0.007 | 0.005 | — | 0.10 | — | — | — | 2.10 | 0.58 | 2.45 | 0.78 | — | 0.094 | — | — |
| W5 | 0.108 | 0.08 | 1.92 | 0.008 | 0.005 | — | — | — | — | — | 2.10 | 0.58 | 2.40 | 0.63 | — | 0.047 | — | — |
| W6 | 0.020 | 0.10 | 1.86 | 0.007 | 0.005 | — | — | — | — | — | 2.10 | 0.58 | 2.27 | 0.63 | — | 0.056 | — | — |
| W7 | 0.010 | 0.15 | 1.92 | 0.005 | 0.005 | 0.01 | 0.01 | 0.01 | — | — | 2.10 | 0.58 | 2.26 | 0.63 | — | 0.094 | — | — |
| W8 | 0.020 | 0.39 | 1.86 | 0.007 | 0.005 | — | — | — | — | — | 3.01 | 0.83 | 2.56 | 0.32 | — | 0.066 | — | — |
| W9 | 0.020 | 0.57 | 1.86 | 0.007 | 0.005 | — | — | — | — | — | 1.09 | 0.30 | 2.27 | 0.63 | — | 0.094 | 0.16 | 0.13 |
| W10 | 0.020 | 0.15 | 1.86 | 0.007 | 0.005 | — | — | — | — | 0.02 | 1.42 | 0.44 | 2.27 | 0.63 | — | 0.094 | — | 0.05 |
| W11 | 0.020 | 0.15 | 1.85 | 0.006 | 0.005 | — | — | — | — | — | 4.13 | 1.14 | 2.27 | 0.63 | — | 0.094 | — | — |
| W12 | 0.014 | 0.14 | 1.58 | 0.005 | 0.005 | 0.01 | — | 0.01 | — | 0.01 | 2.30 | 0.64 | 1.82 | 0.61 | — | 0.085 | — | — |
| W13 | 0.012 | 0.17 | 1.55 | 0.005 | 0.005 | 0.01 | 0.32 | 0.01 | 0.17 | 0.01 | 2.10 | 0.58 | 1.75 | 0.57 | — | 0.104 | — | — |
| W14 | 0.029 | 0.16 | 1.70 | 0.007 | 0.005 | — | 0.10 | — | — | — | 2.10 | 0.58 | 1.98 | 0.63 | — | 0.099 | — | — |
| W15 | 0.020 | 0.15 | 0.93 | 0.007 | 0.005 | — | 0.10 | — | — | — | 2.10 | 0.58 | 0.79 | 0.28 | — | 0.094 | — | — |
| W16 | 0.020 | 0.15 | 1.02 | 0.007 | 0.005 | — | 0.10 | — | — | — | 2.10 | 0.58 | 0.84 | 0.36 | — | 0.094 | — | — |
| W17 | 0.020 | 0.15 | 1.54 | 0.007 | 0.005 | — | 0.10 | — | — | — | 2.10 | 0.58 | 1.51 | 0.51 | — | 0.094 | — | — |
| W18 | 0.020 | 0.10 | 1.60 | 0.007 | 0.005 | — | — | — | — | — | 2.10 | 0.58 | 1.52 | 0.31 | — | 0.061 | — | — |
| W19 | 0.021 | 0.22 | 1.86 | 0.007 | 0.005 | — | 0.31 | — | — | — | 2.10 | 0.58 | 0.99 | 0.78 | — | 0.141 | — | — |
| W20 | 0.021 | 0.85 | 1.86 | 0.007 | 0.005 | — | — | — | — | — | 2.10 | 0.58 | 1.53 | 0.31 | 0.06 | 0.118 | — | — |

TABLE 2

| Wire Nos. | (2 × Mg)/ (0.6 × Al) | {(Mg + Al)/ (Zr + Ti + Ca)} | Mg + Al + Zr + Ti + Ca + REM | Wire water content (WC) | (Total of strong deoxidizing metal elements)/WC |
|---|---|---|---|---|---|
| W1 | 1.02 | 29.7 | 2.9 | 0.027 | 106.4 |
| W2 | 0.89 | 40.7 | 3.9 | 0.024 | 162.1 |
| W3 | 0.88 | 39.3 | 3.8 | 0.029 | 132.7 |
| W4 | 1.06 | 34.2 | 3.3 | 0.024 | 138.5 |
| W5 | 0.87 | 64.3 | 3.1 | 0.025 | 124.1 |
| W6 | 0.92 | 51.3 | 3.0 | 0.021 | 139.4 |
| W7 | 0.93 | 30.1 | 3.0 | 0.029 | 104.0 |
| W8 | 0.41 | 43.4 | 2.9 | 0.022 | 135.8 |
| W9 | 0.92 | 7.4 | 3.3 | 0.028 | 117.7 |

TABLE 2-continued

| Wire Nos. | (2 × Mg)/ (0.6 × Al) | {(Mg + Al)/ (Zr + Ti + Ca)} | Mg + Al + Zr + Ti + Ca + REM | Wire water content (WC) | (Total of strong deoxidizing metal elements)/WC |
|---|---|---|---|---|---|
| W10 | 0.92 | 20.1 | 3.0 | 0.015 | 207.1 |
| W11 | 0.92 | 30.8 | 3.0 | 0.031 | 96.9 |
| W12 | 1.11 | 28.0 | 2.5 | 0.019 | 130.3 |
| W13 | 1.08 | 22.0 | 2.4 | 0.023 | 106.8 |
| W14 | 1.05 | 26.4 | 2.7 | 0.019 | 139.6 |
| W15 | 1.19 | 11.4 | 1.2 | 0.017 | 66.9 |
| W16 | 1.41 | 12.7 | 1.3 | 0.027 | 48.5 |
| W17 | 1.12 | 21.4 | 2.1 | 0.020 | 106.8 |
| W18 | 0.69 | 30.0 | 1.9 | 0.019 | 97.5 |
| W19 | 2.65 | 12.5 | 1.9 | 0.020 | 94.1 |
| W20 | 0.67 | 10.6 | 2.0 | 0.023 | 89.3 |

TABLE 3

Fluoride powder and strong deoxidizing metal elements in flux

| Wire Nos. | Fluoride powder in flux | | | Strong deoxidizing metal elements in flux | | | | |
|---|---|---|---|---|---|---|---|---|
| | Amount of addition (mass %) | Proportion of particles having particle size of 75 μm or less (%) | Fluoride | Amount of addition (mass %) | Proportion of particles having particle size of 150 μm or less (strong deoxidizing metal powder, %) | Strong deoxidizing metal elements | Mg (flux) (mass %) | Al (flux) (mass %) |
| W1 | 19.7 | 81 | BaF, | 22.1 | 84 | Al, Mg, Zr | 5.0 | 16.3 |
| W2 | 20.7 | 81 | BaFa | 30.1 | 84 | Al, Mg, Zr | 6.2 | 23.1 |
| W3 | 20.7 | 81 | BaF2 | 29.1 | 84 | Al, Mg, Zr | 6.0 | 22.4 |
| W4 | 20.7 | 81 | BaF2 | 25.4 | 84 | Al, Mg, Zr | 6.0 | 18.7 |
| W5 | 20.7 | 81 | BaFa | 23.5 | 84 | Al, Mg, Zr | 4.8 | 18.3 |
| W6 | 20.7 | 81 | BaF2 | 22.6 | 84 | Al, Mg, Zr | 4.8 | 17.3 |
| W7 | 20.7 | 81 | BaFs | 22.9 | 84 | Al, Mg, Zr | 4.8 | 17.3 |
| W8 | 29.7 | 81 | BaFa | 22.5 | 83 | Al, Mg, Zr | 2.4 | 19.5 |
| W9 | 10.7 | 81 | BaFs | 25.2 | 84 | Al, Mg, Zr, REM, Ca | 4.8 | 17.3 |
| W10 | 14.0 | 81 | BaFs + CaFs | 22.9 | 84 | Al, Mg, Zr, Ca | 4.8 | 17.3 |
| W11 | 40.7 | 81 | BaFs | 22.9 | 84 | Al, Mg, Zr | 4.8 | 17.3 |
| W12 | 22.7 | 81 | BaFs | 19.2 | 84 | Al, Mg, Zr | 4.7 | 13.9 |
| W13 | 20.7 | 81 | BaFs | 18.6 | 84 | Al, Mg, Zr | 4.4 | 13.4 |
| W14 | 20.7 | 81 | BaFs | 20.7 | 84 | Al, Mg, Zr | 4.8 | 15.1 |
| W15 | 20.7 | 81 | BaFs | 8.8 | 84 | Al, Mg, Zr | 2.2 | 5.9 |
| W16 | 20.7 | 81 | BaFs | 9.8 | 83 | Al, Mg, Zr | 2.7 | 6.3 |
| W17 | 20.7 | 81 | BaFs | 16.1 | 84 | Al, Mg, Zr | 3.9 | 11.5 |
| W18 | 20.7 | 81 | BaFs | 14.5 | 85 | Al, Mg, Zr | 2.4 | 11.5 |
| W19 | 20.7 | 81 | BaFs | 14.6 | 81 | Al, Mg, Zr | 6.0 | 7.4 |
| W20 | 20.7 | 81 | BaFs | 15.3 | 85 | Al, Mg, Zr, Ti | 2.4 | 11.6 |

TABLE 4

| | Threshold current, at and below which no burn-through of molten metal occurred, and other conditions | | | | Evaluations | |
|---|---|---|---|---|---|---|
| Test Nos. | Wire Nos. | Threshold current (A) | Feed rate (m/min) | Arc voltage (V) | Welding speed (cm/min) | Resistance to burn-through of molten metal | Bead appearance |
| T1 | W1 | 232 | 3.82 | 25.0 | 18 | A | A |
| T2 | W2 | 232 | 3.82 | 25.1 | 18 | A | A |
| T3 | W3 | 232 | 3.82 | 25.1 | 18 | A | A |
| T4 | W4 | 230 | 3.82 | 25.0 | 18 | A | A |
| T5 | W5 | 233 | 3.82 | 23.1 | 18 | A | B |
| T6 | W6 | 235 | 3.82 | 25.2 | 18 | A | A |
| T7 | W7 | 206 | 3.31 | 20.4 | 15 | B | B |
| T8 | W8 | 232 | 3.82 | 25.1 | 18 | A | B |
| T9 | W9 | 230 | 3.82 | 21.0 | 17 | A | B |
| T10 | W10 | 227 | 3.82 | 23.1 | 18 | B | B |
| T11 | W11 | 220 | 3.82 | 25.1 | 18 | B | B |
| T12 | W12 | 232 | 3.82 | 25.2 | 18 | A | A |
| T13 | W13 | 224 | 3.82 | 23.1 | 18 | B | B |
| T14 | W14 | 226 | 3.82 | 23.0 | 18 | B | B |
| 115 | W15 | 160 | 2.29 | 23.0 | 12 | C | C |
| T16 | W16 | 95 | 1.27 | 21.0 | 13 | C | C |

TABLE 4-continued

| | | Threshold current, at and below which no burn-through of molten metal occurred, and other conditions | | | | Evaluations | |
|---|---|---|---|---|---|---|---|
| Test Nos. | Wire Nos. | Threshold current (A) | Feed rate (m/min) | Arc voltage (V) | Welding speed (cm/min) | Resistance to burn-through of molten metal | Bead appearance |
| T17 | W17 | 90 | 2.29 | 21.0 | 20 | C | C |
| T18 | W18 | 160 | 2.29 | 20.0 | 18 | C | C |
| T19 | W19 | 93 | 1.27 | 21.8 | 18 | C | B |
| T20 | W20 | 130 | 1.78 | 20.5 | 15 | C | B |

The results shown above demonstrate that all of W15 to W20, in which Al and Mg were included as strong deoxidizing metal elements, and a total content thereof relative to the total mass of the wire was less than 2.2 mass %, had poor resistance to burn-through of molten metal and/or a poor bead appearance. Furthermore, it was confirmed that the ratio between the content of the strong deoxidizing metal elements and the water content relative to the total mass of the wire affects the resistance to burn-through of molten metal and the bead appearance.

Although the present invention has been described in detail with reference to particular embodiments, it will be apparent to those skilled in the art that various changes and modifications may be made thereto without departing from the spirit and scope of the invention. The present application is based on Japanese patent application No. 2019-114818, filed on Jun. 20, 2019, the contents of which are incorporated herein by reference.

The invention claimed is:

1. A flux-cored wire comprising a flux and a hoop, the flux forming a core, the hoop forming a sheath, wherein:
   the flux comprises strong deoxidizing metal elements$_{(flux)}$ and at least one fluoride powder, and the strong deoxidizing metal elements$_{(flux)}$ include Mg and Al,
   a total content of the strong deoxidizing metal elements$_{(flux)}$ is 15 to 35 mass % relative to a total mass of the flux,
   at least a portion of the Mg and the Al of the strong deoxidizing metal elements$_{(flux)}$ is present as a strong deoxidizing metal powder, and the strong deoxidizing metal powder is at least one of a metal powder or an alloy powder,
   60 mass % or more of the strong deoxidizing metal powder has a particle size of less than or equal to 150 µm,
   a total content of the at least one fluoride powder is 10 to 45 mass % relative to the total mass of the flux,
   60 mass % or more of the at least one fluoride powder has a particle size of less than or equal to 75 µm,
   the flux is present in an amount of 10 to 30 mass %, relative to a total mass of the flux-cored wire, and
   the flux-cored wire comprises, relative to the total mass of the flux-cored wire:
     C: 0.5 mass % or less;
     Si: 0.05 to 1.0 mass %;
     Al: 1.0 to 3.5 mass %;
     Mn: 1.0 to 3.0 mass %;
     Mg: 0.3 to 0.9 mass %;
     a total of at least one fluoride, in an amount F calculated in terms of fluorine: 0.30 to 1.20 mass %; and
     a total of strong deoxidizing metal elements$_{(wire)}$: 2.2 mass % or greater.

2. The flux-cored wire according to claim 1, wherein the flux-cored wire further comprises, relative to the total mass of the flux-cored wire:
   Ni: 15 mass % or less;
   Mo: 5.0 mass % or less;
   W: 3.0 mass % or less;
   Nb: 5.0 mass % or less;
   V: 5.0 mass % or less;
   Cr: 30 mass % or less;
   Ti: 3.0 mass % or less;
   Zr: 2.0 mass % or less;
   O: 0.05 mass % or less;
   N: 0.05 mass % or less;
   S: 0.05 mass % or less;
   P: 0.05 mass % or less;
   B: 0.05 mass % or less;
   Cu: 5.0 mass % or less;
   Ba: 5.0 mass % or less;
   a total of at least one alkali metal element: 3.0 mass % or less;
   Ca: 3.0 mass % or less;
   a total of at least one rare earth metal: 0.5 mass % or less; and
   Fe: 40 mass % or greater.

3. The flux-cored wire according to claim 1, wherein the fluoride powder is at least one powder of a compound selected from the group consisting of $BaF_2$, $SrF_2$, $Na_3AlF_6$, NaF, $MgF_2$, and $CaF_2$.

4. The flux-cored wire according to claim 2, wherein the fluoride powder is at least one powder of a compound selected from the group consisting of $BaF_2$, $SrF_2$, $Na_3AlF_6$, NaF, $MgF_2$, and $CaF_2$.

5. The flux-cored wire according to claim 1, wherein
   a water content (WC) is 0.010 to 0.100 mass % relative to the total mass of the flux-cored wire, and
   the water content (WC) and the total content of the strong deoxidizing metal elements$_{(wire)}$ satisfy a relationship of
   105≤(the total content of the strong deoxidizing metal elements$_{(wire)}$/WC)≤170.

6. The flux-cored wire according to claim 1, wherein the content of Al and the content of Mg, relative to the total mass of the flux-cored wire, satisfy a relationship of $$0.35 \leq (2 \times Mg/0.6 \times Al) \leq 1.50.$$

7. The flux-cored wire according to claim 1, wherein the strong deoxidizing metal elements$_{(flux)}$ further comprise at least one element selected from the group consisting of Zr, Ti, and Ca, and
   wherein the contents of Mg, Al, Zr, Ti, and Ca, relative to the total mass of the flux-cored wire, satisfy a relationship of 5≤{(Mg+Al/(Zr+Ti+Ca)}≤70.

8. The flux-cored wire according to claim 1, wherein the flux further comprises Ni in the form of at least one selected from the group consisting of elemental Ni, Cu—Ni, Fe—Ni, and Ni—Mg.

9. A gas shielded arc welding method, comprising welding with the flux-cored wire according to claim 1 at a welding current of greater than 200 A in a shielding gas atmosphere.

10. The gas shielded arc welding method according to claim 9, wherein the welding is performed in a welding position, and the welding position is at least one of an overhead position or a vertical position.

11. The gas shielded arc welding method according to claim 9, wherein the shielding gas comprises 70 vol % or more Ar.

12. The gas shielded arc welding method according to claim 9, wherein the shielding gas comprises 70 vol % or more $CO_2$.

\* \* \* \* \*